Patented July 31, 1923.

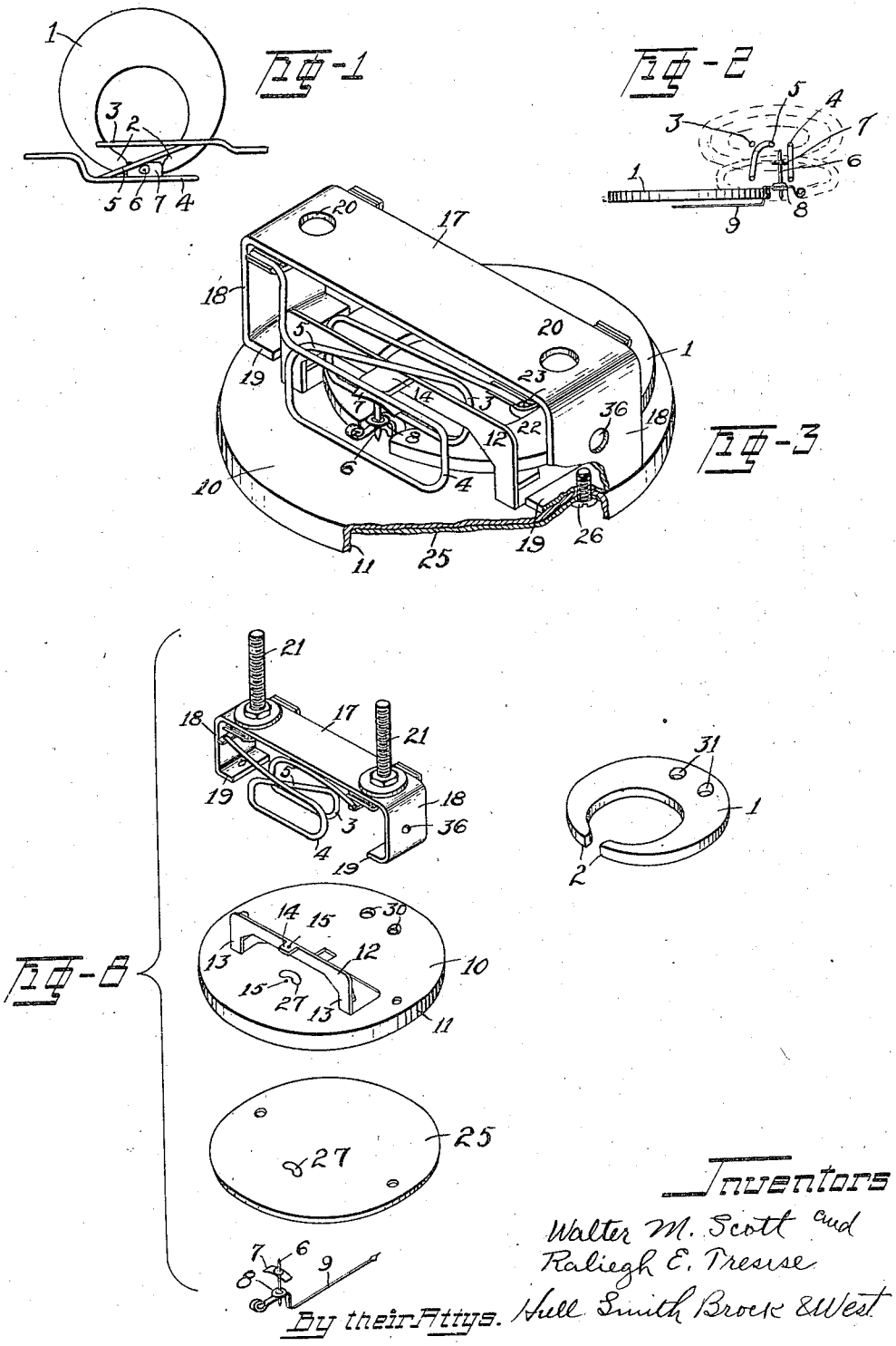

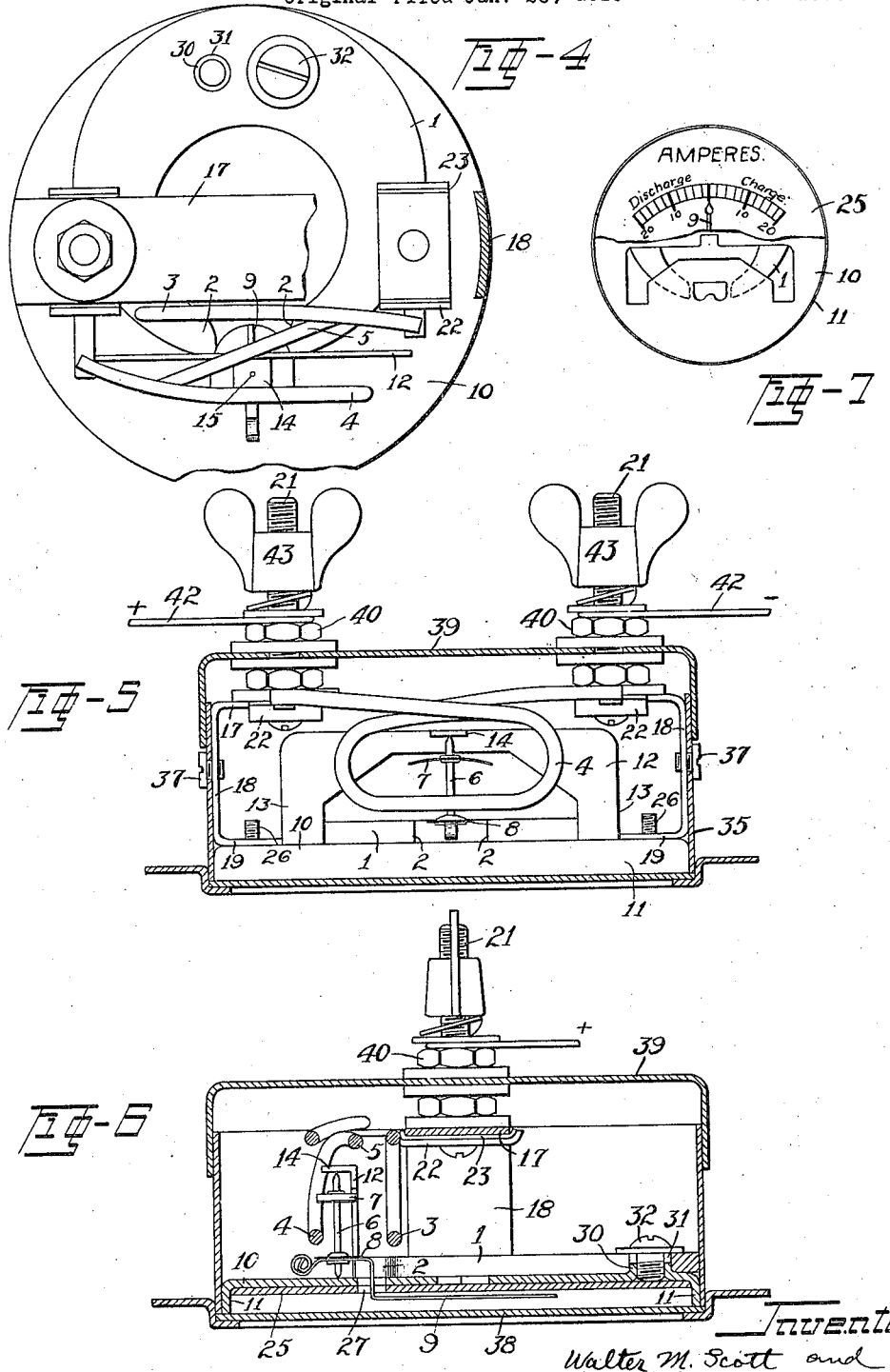

1,463,597

UNITED STATES PATENT OFFICE.

WALTER M. SCOTT, OF LAKEWOOD, AND RALEIGH E. TRESISE, OF CLEVELAND, OHIO.

ELECTRIC MEASURING INSTRUMENT.

Application filed January 26, 1918, Serial No. 213,854. Renewed January 10, 1922. Serial No. 528,205.

*To all whom it may concern:*

Be it known that we, (1) WALTER M. SCOTT and (2) RALEIGH E. TRESISE, citizens of the United States, residing at Lakewood and Cleveland, respectively, in the county of Cuyahoga and State of Ohio, have invented a certain new and useful Improvement in Electric Measuring Instruments, of which the following is a full, clear, and exact description, reference being had to the accompanying drawings.

This invention relates to electrical measuring instruments and has particular reference to a small sized ammeter although the features of construction hereafter described and claimed are equally applicable to voltmeters. The instrument illustrated and described herein has been developed with especial reference to use on the cowl-boards of explosion engine vehicles to show the charging and discharging rate of the starting and lighting battery ordinarily used in such vehicles, though it will be understood that we do not limit ourselves to this use. Owing to the exposed position, the extreme vibration, and the indifferent care to which such an instrument is subjected, its requirements are unusually severe; added to which is the requirement of cheapness.

The objects of our invention are the provision of an instrument of this general nature which shall be "dead beat" both under load and under vibration; which shall be free from springs, dash pots and other delicate or close-fitting contrivances; which shall not be injured by vibration or by a temporary overload even up to two hundred amperes, its maximum scale capacity; which shall have a comparatively even scale; the obtaining of all these objects together with the further object of practical accuracy by means of a simple, rugged, and inexpensive structure; while further objects and advantages of our improvements will become apparent as the description proceeds.

In the drawings accompanying and forming a part of this application we have illustrated one operative construction in which our invention can be embodied, although these drawings are to be taken in an illustrative and not a limiting sense, since there are many other specific constructions in which our invention can be embodied, only a few of which can be indicated in the present description.

These drawings illustrate an ammeter, Figs. 1 and 2 being diagrammatic views illustrating the arrangement of the essential elements; Fig. 3 is a perspective view of our improved ammeter taken from the rear; Fig. 4 is a back view of the works of our improved ammeter; Figs. 5 and 6 are central sectional views through the complete ammeter and case; Fig. 7 is a face view of the said ammeter, the case being omitted and part of the dial plate broken away; and Fig. 8 is a separated perspective view showing the various parts of the ammeter works.

The essential elements of our ammeter consist of a permanent magnet, a solenoid or current coil and a movable system, comprising an armature which is subjected to the influence of both the magnet and solenoid, and also having a damping device; and in its more generic aspect the essence of our invention consists in locating said current coil wholly to one side of the permanent magnet with its field parallel to the magnet face and perpendicular to the line joining the magnet poles, said coil being formed in two separated portions between whose projections said magnet poles are located. The movable system comprises a staff traversing the space between the magnet poles and intersecting the current coil, its axis being perpendicular to the field of the coil and to the plane of the magnet and to the line joining the magnet poles; said staff having an elongated armature of soft iron or soft steel secured thereto inside the limits of the coil and also having a pointer and a damping device; said damping device consisting of a circular metal disk or cylinder carried by the staff between or adjacent to the magnet poles. Referring to Figs. 1 2, 1 represents the magnet, which is made of substantially closed form having poles 2—2 facing each other and defining a rather narrow air gap. The current coil preferably consists of a portion 3 and a portion 4 spaced apart and connected by a portion 5, the portions 3 and 4 being spaced apart and arranged substantially as shown. 6 represents the staff, 7 the armature carried thereby, 8 the damping member, and 9 the pointer.

This arrangement of parts produces the following advantageous results: The member 8 being located in or adjacent to a point of high concentration of the permanent field tends to resist rapid or vibratory movement of the pointer, its damping effect being produced partly by eddy currents induced in the metal and partly (when this member is made of iron as is preferable) by a displacement of the induced magnetism thereof which is opposed by the hysteresis. The coil being located outside of the magnet and having its separated portions arranged upon opposite sides of the poles, a very great overload of short duration, even as high as 200 amperes will have no demagnetizing effect upon the permanent magnet. The armature 7 being located in the maximum field of the current coils and out of the maximum field of the permanent magnet is more equally affected by the two fields than heretofore and a more uniform scale secured along with remarkable accuracy. It will be seen that both portions of the current coil are located upon the same side of a plane containing the magnet poles (and in the present embodiment including the magnet body also), and also upon opposite sides of a plane which is perpendicular to the first plane and also passes through the two poles. In the construction illustrated the axis of the current coil is parallel to the plane of the magnet body, but this, while desirable, is not imperative.

Now describing the preferred construction whereby these advantages are secured, 10 represents a circular plate of non-magnetic material having a peripheral rim 11. From the body of this plate there is struck up a frame part 12 having at its end the legs 13 integrally connected with the plate and having at its middle point the projecting lug 14. This frame is bent at right angles with the plate 10 and the lug 14 is turned over until it is parallel with the plate 10, said lug and the portion of the plate directly beneath being formed with apertures or sockets 15—15 for the reception of the staff 6.

An elongated metal bridge 17 has its ends turned to right angles as shown at 18—18 and again at right angles as shown at 19—19. Adjacent to each end the bridge 17 is formed with an aperture 20 receiving the threaded studs 21—21 to which are secured the clips 22, the same being insulated from the member 17 by suitable washers 23. The ends of the current coil are attached to these clips in such wise that when the bridge 17 is secured to the plate 10 the portions 3 and 4 thereof will fall on opposite sides of the frame 12, the portion 5 passing freely over the top of that frame.

Inside the cup defined by the rim 11 is located the circular dial plate 25 which is secured in place by screws 26 traversing the dial plate and base plate 10 and tapped into the portions 19—19 whereby the entire device is held together. The plates 10 and 25 are formed with registering curvilinear apertures 27—27 for the passage of the pointer 9. The plate 10 is also formed with a pair of spaced bosses 30—30 punched therefrom and entering the apertures 31—31 formed in the body of the magnet 1, the interior of at least one of these bosses being threaded for the reception of the screw 32 whereby the magnet is held in place. The uprights 18—18 of the frame 17 are preferably formed flush with the lip 11 so as to fit snugly in the interior of the cylindrical case 35 in which the works are inserted, and are preferably formed with the threaded apertures 36 receiving screws 37 by which the works are held in said case. At its front side this case is provided with a transparent pane 38, and at its rear with a metal cover 39, suitably apertured for the passage of the studs 21—21. Nuts 40—40 serve to secure this cover in place, suitable insulating washers being interposed to prevent grounding or short circuiting of the parts, and the lead wires 42—42 are secured to said studs by means of suitable thumb screws 43—43.

In addition to the electrical and operating advantages secured by the arrangement of the essential parts first described, the detailed construction herein set forth can all be made by stampings, even to the magnet 1; the parts can be assembled with a minimum of labor; absolute uniformity of output is secured; while the arrangement of the works wholly independent of the case permits adjustment and calibration to be effected before the works are applied to the case and while all parts of the same are accessible. The instrument is proof against over-load, is not affected by any shocks or blows that the glass cover can withstand, is highly dead-beat, gives practically equal deflections upon opposite sides of the zero point, thus showing charging and discharging rates, and is highly accurate.

The damping effect can be varied widely by changing the size, shape, thickness, material and location of the damping member, since the larger the dimensions of this member, either diameter or axial length, the more marked its effect will be. We prefer to make this member of the softest possible iron so that its residual magnetism will be small, although by suitably choosing its dimensions different qualities of steel can also be employed. In fact a non-magnetic metal can be used for this member, but with a considerable loss of damping effect since in that case only the eddy currents are available to restrain motion, there being no hysteresis effect. The size of the armature must also be adjusted in comparison with that of the damping member. Inasmuch as the size and magnetization of the permanent magnet, the size, shape and material of the damping member, the size, shape and material of the armature, and the distance of the armature and damping member from each other and from the plane of the magnet are all interrelated, it is obvious that a change in any one of these must be balanced by a change elsewhere, but a proper adjustment of these features can easily be effected within the scope of the explanation heretofore given. It will be understood that the number of turns in the current-coil can be increased to any desired extent, and in the case of a voltmeter will necessarily be largely increased; also that great changes in other details can be made without departing from our invention and we do not limit ourselves to any details here pointed out except as specifically recited in the claims hereto annexed.

Having thus described our invention, what we claim is:—

1. In an electric measuring instrument, in combination, a sheet metal base plate, a rectangular frame integral therewith and projecting perpendicularly therefrom, said frame having an overhanging part and said base plate having an aperture, a pivot bearing in said overhanging part, a second bearing in the base plate opposite thereto, a staff journaled in said bearings, a pointer carried by said staff and passing through said aperture, a permanent magnet carried by said base plate, an armature carried by said staff upon the opposite side of said magnet from said base plate, a bridge attached to said base plate, and a current coil carried by said bridge, said coil being made in two spaced parts which straddle said frame and embrace said armature but lie wholly at one side of the magnet.

2. In an electric measuring instrument, in combination, a base plate having an aperture, a frame carried by said base plate at one side thereof, pivot bearings carried by said plate and frame respectively, a staff journaled therein and having a pointer which traverses said aperture, an armature carried by said staff, a bridge attached to said base member independently of said frame, and a current coil carried by said bridge, said coil being made in two spaced parts which straddle said frame and embrace said armature.

3. In an electric measuring instrument, in combination, a base plate, a frame carried thereby, a staff pivoted thereto perpendicular to the plate, an armature carried by said staff, a bridge attached to said plate, a current coil carried by said bridge and made in two longitudinally separated halves adapted to straddle said frame and embrace said armature, and current terminals carried by said bridge.

4. In an electric measuring instrument, in combination, a circular plate, a bridge attached to one side thereof and spaced therefrom, current terminals carried by said bridge, a current coil connecting said terminals and located at one side of said bridge, said coil being formed in two spaced portions having a common axis which is parallel to the face of the plate, a frame carried by said plate independently of said bridge, a staff pivoted in said frame, and an armature carried by said staff inside the limits of said coil, the two halves of said coil straddling said frame and staff.

5. In an electric measuring instrument, in combination, a sheet metal base plate, a frame having a pair of spaced side portions integral with said plate and a connecting portion integral with the side portions and spaced from said plate, a staff pivoted between said frame and plate, a permanent magnet carried by one side of said plate, a dial carried by the other side of said plate, a pointer secured to said staff and cooperating with said dial, an armature carried by said staff, and a current coil carried by said base plate independently of said frame and surrounding said armature.

6. In an electric measuring instrument, in combination, a base plate, a frame carried by said base plate, a staff pivoted in said frame, said base plate having an aperture near said staff, a permanent magnet carried by said base plate and having its poles located one on each side of said staff, a pointer carried by said staff and projecting through said aperture, a dial carried by the side of said base plate opposite said magnet and cooperating with said pointer, an armature carried by said staff upon the opposite side of said magnet from said base plate, a support carried by said base plate independently of said frame, and a current coil carried by said support and surrounding said armature, the turns of said coil being interposed between the armature and magnet.

7. In an electric measuring apparatus, in combination, a circular base plate, a bridge carried thereby and having its legs flush with opposite edges of said base plate, a current coil and a permanent magnet, one of which is carried by the bridge and the other by the base plate, and a movable system carried by the base plate, said movable system including an armature subjected both to the current coil and to the magnet and a pointer cooperating with a dial carried by the base plate, current terminals carried by said bridge, and a case enclosing all the parts recited and connected solely to said bridge.

8. In an electric measuring instrument, in combination, a circular base plate, a frame carried by said base plate, a staff pivoted between said frame and base plate, a permanent magnet carried by said base plate and having its poles facing each other, one on each side of said staff, a dial carried by said base plate upon the side opposite to that whereon said magnet is located, a pointer carried by said staff and cooperating with said dial, a metallic damping disk carried by said staff adjacent to or between said magnet poles, an iron armature carried by said staff upon the other side of said disk from said pointer and at a distance from the magnet poles, a bridge carried by said base plate and traversing said magnet, current connections carried by said bridge, and a current coil supported by said bridge and surrounding said armature, said coil lying entirely upon the side of said magnet opposite to said pointer and having its end portions disposed one at each side of said armature, the field of said coil being substantially perpendicular to the field between said magnet poles.

In testimony whereof, we hereunto affix our signatures.

WALTER M. SCOTT.
RALEIGH E. TRESISE.